Figure 2B:
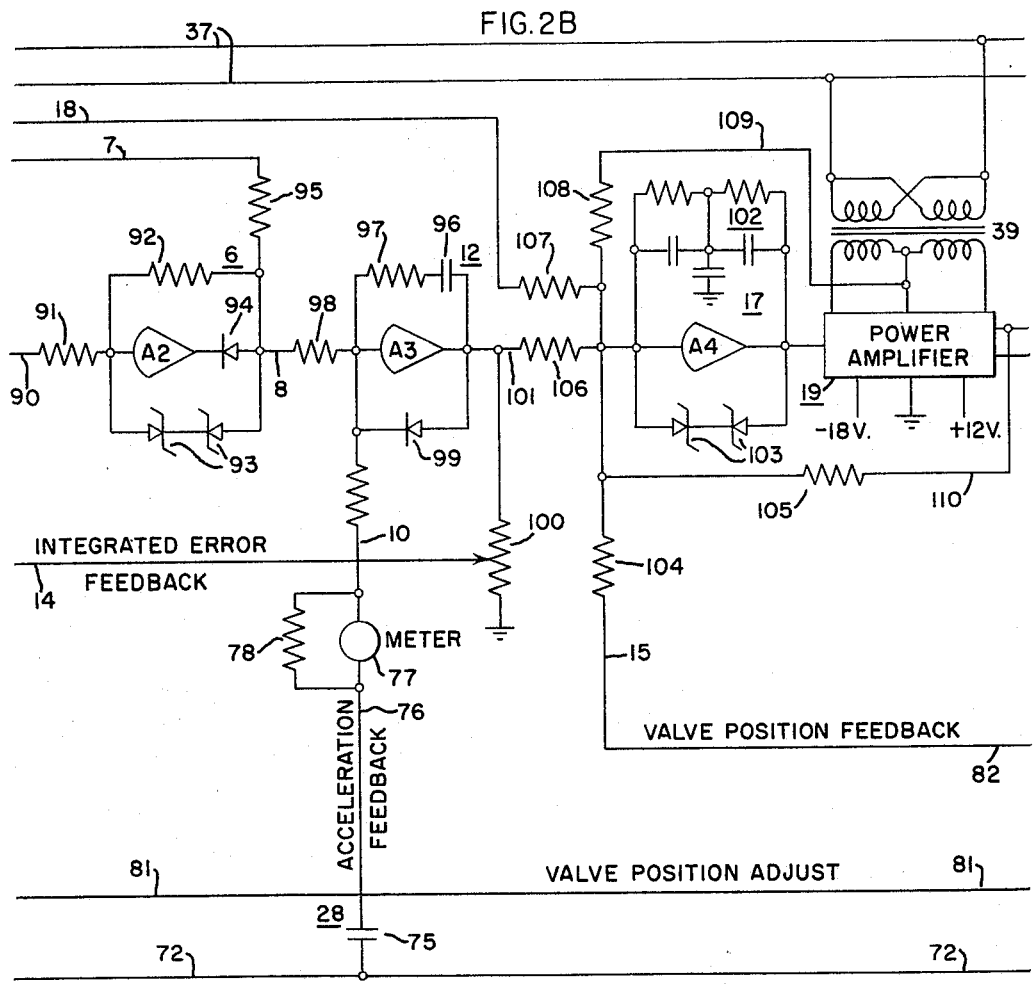

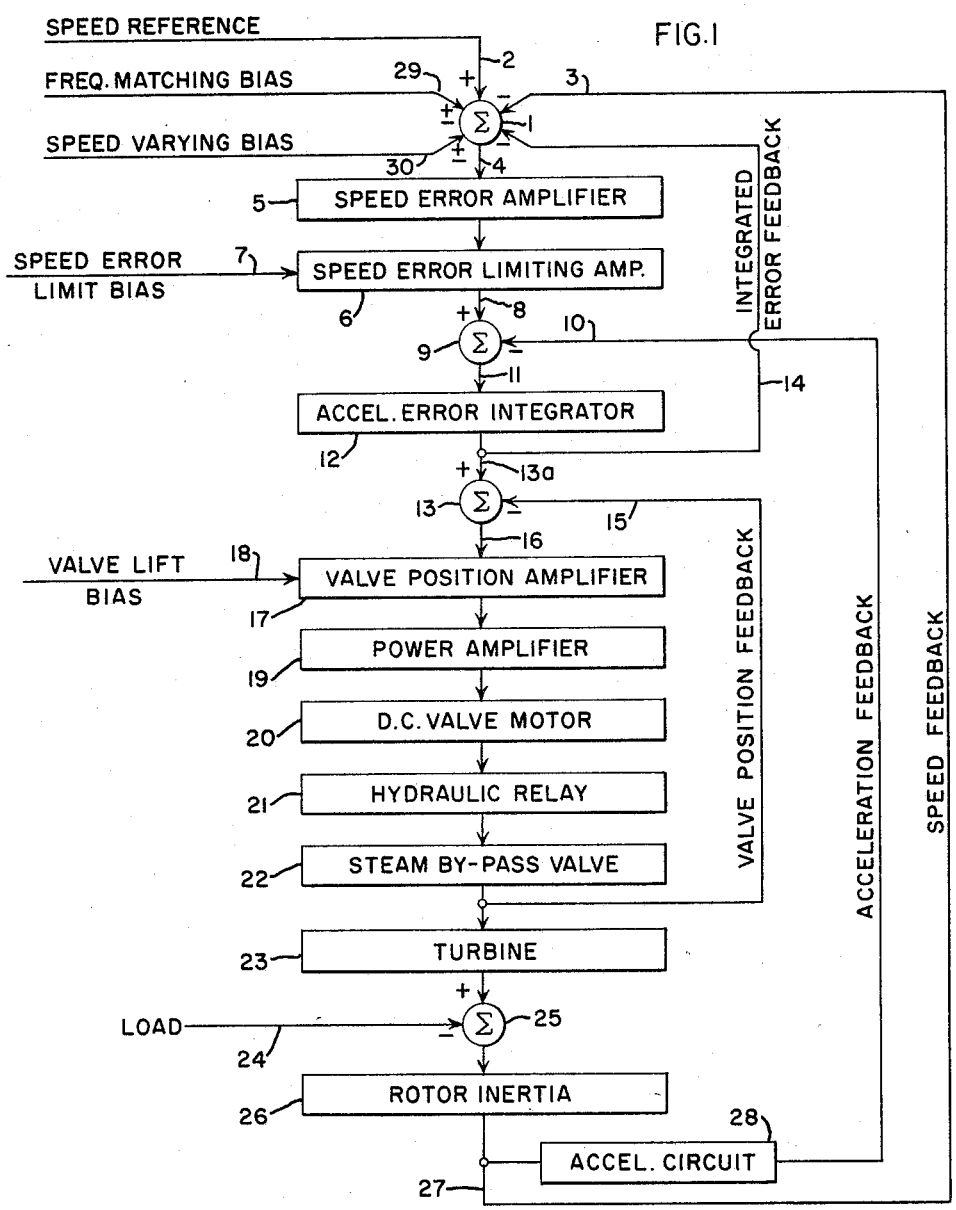

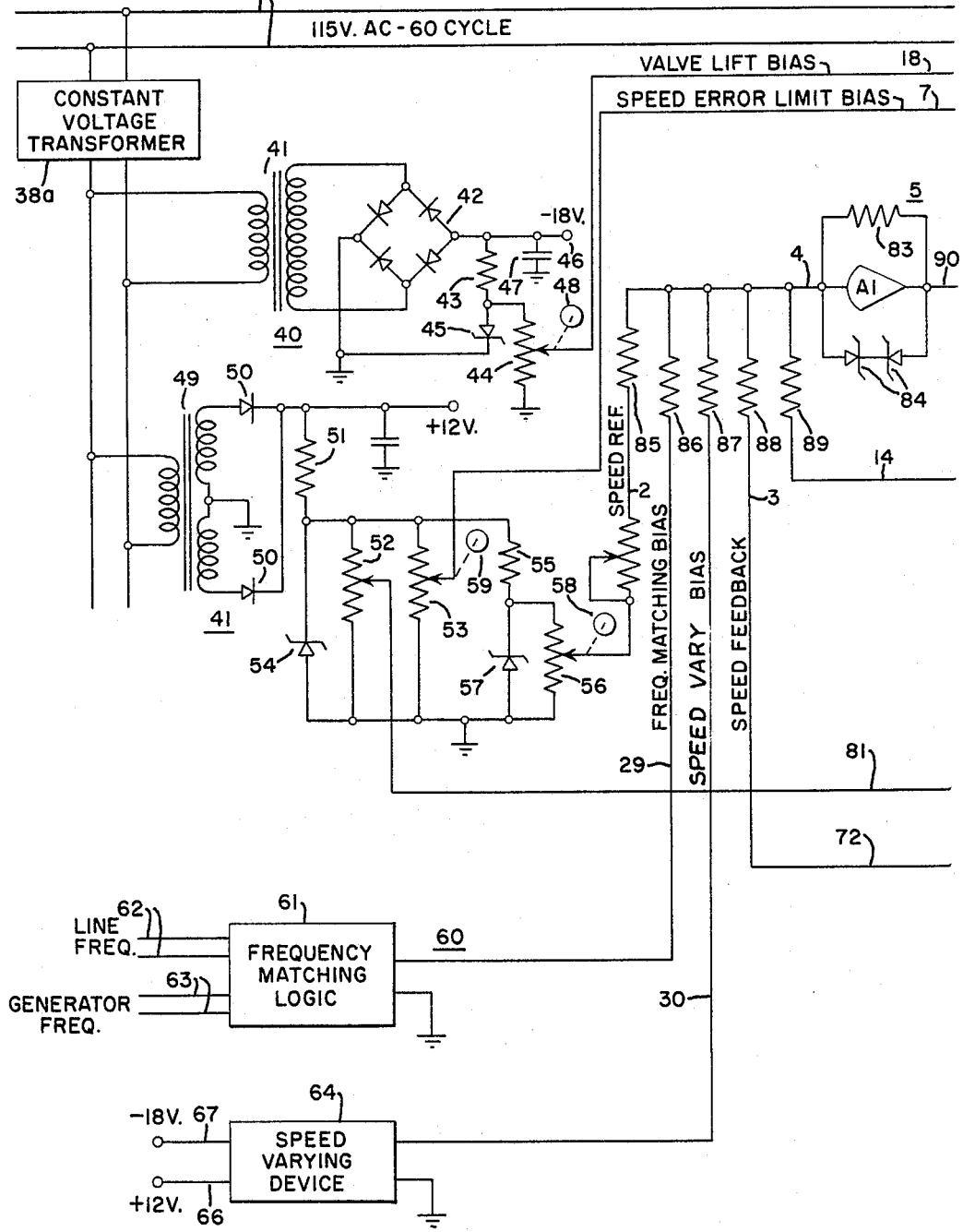

Nov. 29, 1966   M. A. EGGENBERGER ET AL   3,288,160
ACCELERATION LIMITING LONG RANGE SPEED CONTROL
Filed April 1, 1964   4 Sheets-Sheet 3

INVENTORS:
MARKUS A. EGGENBERGER,
PAUL H. TROUTMAN,
BY W. C. Crutcher
THEIR ATTORNEY.

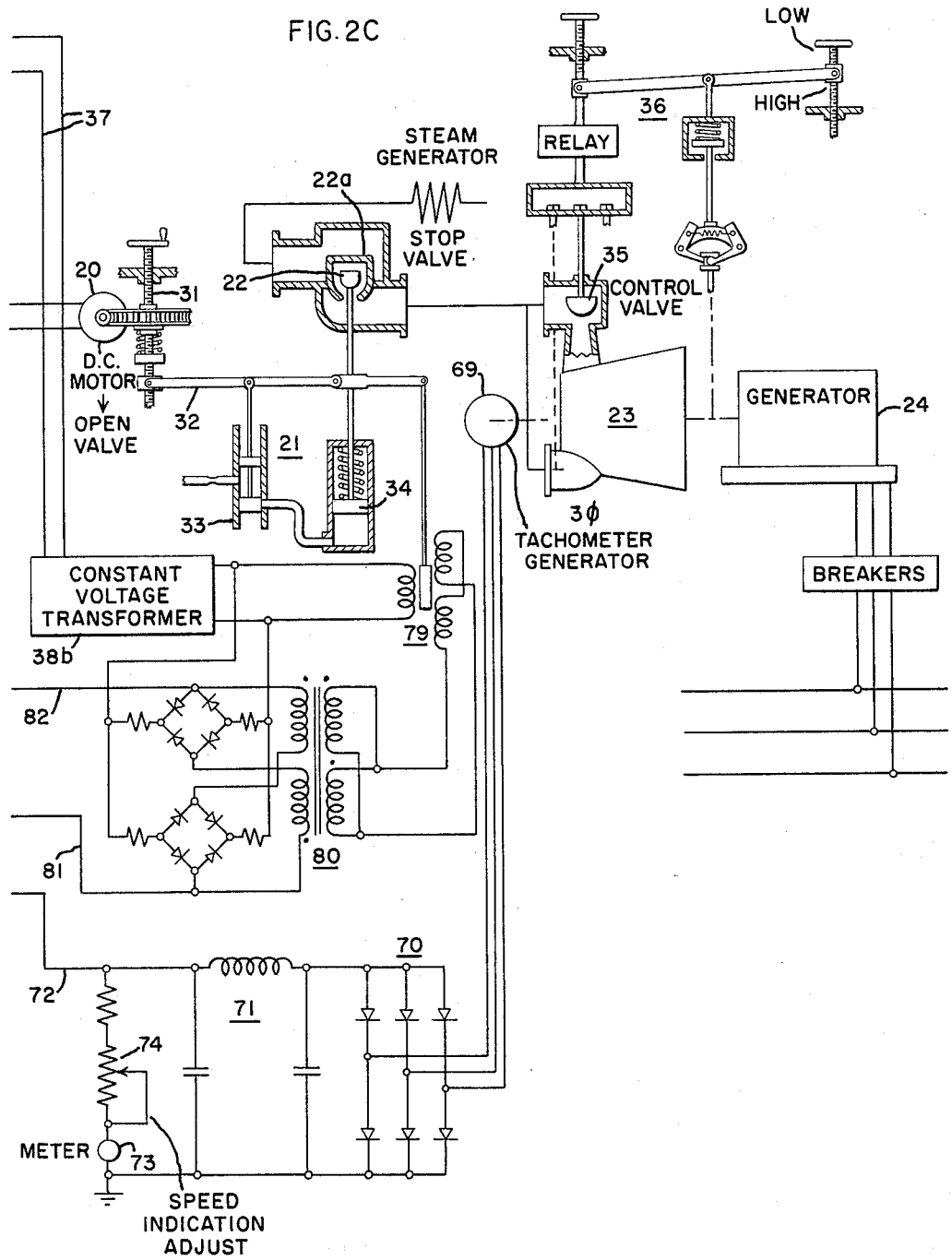

United States Patent Office 3,288,160
Patented Nov. 29, 1966

3,288,160
ACCELERATION LIMITING LONG RANGE SPEED CONTROL
Markus A. Eggenberger and Paul H. Troutman, Schenectady, N.Y., assignors to General Electric Company, a corporation of New York
Filed Apr. 1, 1964, Ser. No. 356,446
6 Claims. (Cl. 137—27)

This invention relates to a long range speed control for a prime mover, such as a steam turbine, for directly controlling and limiting speed and acceleration of the prime mover from standstill to rated speed and also for accurately controlling speed in the vicinity of rated speed.

It is desirable to control the acceleration of a large steam turbine from standstill to rated speed. Scheduling of the startup time is desirable in order to reduce the imposition of thermal stresses on the turbine parts as the high temperature, high pressure steam is admitted to a cold turbine.

The function of a long range speed control is to control the acceleration, speed, and under some conditions the power output of the steam turbine. One example of a long range speed control is disclosed in U.S. Patent 3,098,176, issued to M. A. Eggenberger, P. H. Troutman, and J. J. Sauter on July 16, 1963, and assigned to the assignee of the present application. That patent, which is incorporated herein by reference, discloses an electric long range speed governor, where the steam turbine valves are controlled by electrical signals in a closed loop control system, employing both speed feedback and valve position feedback. Acceleration control is accomplished by a time-increasing electrical signal serving as a speed reference.

Although the employment of a time-increasing speed reference signal to obtain a desired acceleration as set forth in the foregoing Patent 3,098,176, will perform satisfactorily under most conditions, there is a possibility of one of the auxiliary controls limiting valve movement while the speed reference signal continues to increase. When the restraint of the auxiliary control is removed, undesirable high rates of acceleration to the value dictated by the new speed reference may occur.

The advent of reliable solid state operational amplifiers has given rise to electrohydraulic control systems having complex control features for speed and load control of turbines. Also digital computers have been employed to perform a sequence of programmed steps in lieu of an operator in starting up a steam turbine power plant. Such known systems which control acceleration in an indirect manner are satisfactory as long as events occur in the predicted fashion. The present invention offers improvements over known control systems by employing analog computer closed loop control operating in two separate modes, i.e., acceleration control mode and speed control mode, with provisions for shifting automatically from one mode to the other. The system controls turbine acceleration directly rather than indirectly, with improved flexibility and with substantial savings in complexity, size, weight and cost.

Accordingly, one object of the present invention is to provide an improved long range speed control which directly controls prime mover acceleration when operating in one mode and which accurately controls speed when operating in another mode.

Another object of the invention is to provide an improved long range speed control employing an analog computer-type closed loop system to effect direct control over acceleration, speed, and partial load.

Still another object of the invention is to provide an improved long-range speed control, which provides for selection of startup time with controlled acceleration to the desired speed and automatic changeover to speed control to hold the prime mover at a selected desired speed.

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a block diagram of the acceleration limiting, long range speed control as applied to a steam turbine-generator.

FIG. 2a, 2b and 2c, together comprise a simplified schematic drawing of a preferred form of the acceleration limiting long range speed control.

Figure 3:
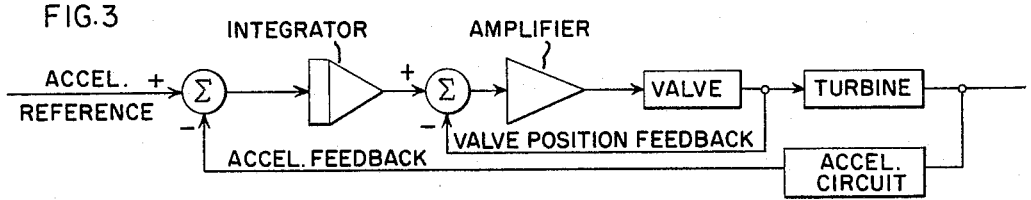
Figure 4:
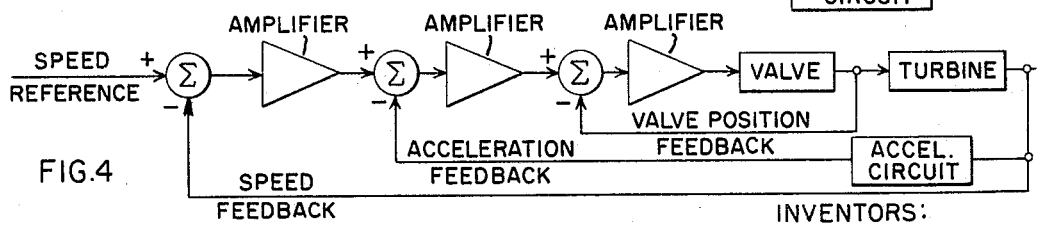

FIG. 3 is a further simplified block diagram illustrating the operation of the system during startup when operating in the acceleration control mode, and, FIG. 4 is a simplified block diagram of the system when operating in the speed control mode.

Briefly stated, the invention is practiced by employing a limiting circuit to selectively limit a speed error signal representative of the difference between a desired reference speed and the turbine actual speed to a maximum selected value in the valve opening direction. When the speed error signal is limited, it serves as an acceleration reference, which is then compared with a feedback signal representative of actual turbine acceleration, and the resulting acceleration error signal controls valve movements to maintain uniform acceleration. When the speed error signal is not limited, the system automatically switches to a normal closed loop speed control system. In the preferred embodiment, the acceleration error signal is integrated during the acceleration mode, but the integrator is automatically disabled and converted to a phase lead circuit in the speed mode.

*Block diagram (FIG. 1)*

Referring now to FIG. 1 of the drawing, the control system is shown as a block diagram with the elements arranged in vertical array reading from top to bottom rather than the usual horizontal array in order to conserve space. The convention followed is that signals to the summing junctions which are internal to the system, i.e., the feedback signals, are shown on the right, while inputs external to the system are shown on the left.

A summing junction 1 serves to compare electrical signals representing desired final turbine speed, shown as speed reference 2, and a signal representing actual speed shown as speed feedback 3. The difference or speed error signal 4, is amplified in speed error amplifier 5, and further amplified in speed error limiting amplifier 6. A selectable electrical signal 7, limiting the maximum value of the speed error signal in a valve opening direction, is suppled to speed error limiting amplifier 6. The resulting limited speed error signal 8, is furnished to summing junction 9 where it is compared with a signal representing actual turbine acceleration, designated acceleration feedback 10. The resulting error signal 11 is acted upon by the acceleration error integrator 12 and supplied to summing junction 13 as a valve positioning signal 13a. Under some circumstances, valve positioning signal 13a is fed back to summing junction 1 to act as integrated error feedback 14.

At this point, the valve positioning signal 13a signal entering summing junction 13 is either an integrated acceleration error signal or is an amplified speed error signal combined with an acceleration feedback signal as will be explained further in detail. Valve positioning signal 13a is compared with a signal representative of actual valve position indicated as valve position feedback 15. The resulting valve position error signal 16 is amplified in valve position amplifier 17. The valve opening may be further increased to add load to the turbine by superimposing a selectable electrical signal to the valve position amplifier 17, shown as valve lift bias 18. The signal from the valve position amplifier is further amplified in the power amplifier 19, and depending upon its magnitude and polarity, operates a D.-C. valve motor 20 which controls a hydraulic relay 21 to operate a steam bypass valve 22. The actual valve position is sensed by a transducer which supplies the valve position feedback 15.

According to the position of the steam valve 22, the power made available to a steam turbine 23 is expended upon a generator load 24, indicated symbolically by an arrow entering a summing junction 25 with a negative sign. The difference between the power supplied to the turbine and the generator load, if any, supplies positive or negative torque to accelerate or decelerate the rotors of the units as indicated symbolically by inertia block 26. The resulting controlled variable, therefore, is turbine speed as indicated by line 27. An electrical speed feedback signal representative of actual turbine speed is sensed by a transducer (not shown) and supplied to summing junction 1. The same electrical signal is also acted upon by an acceleration circuit 28 which produces a signal representative of rate of change of speed or acceleration which is fed back to summing junction 9.

It remains to note that additional external bias signals for special purposes may be supplied to summing junction 1. Representative of these are the frequency matching bias 29 and the speed-varying bias 30.

*Schematic diagram (FIGS. 2a, 2b, 2c)*

Referring now to FIGS. 2a, 2b, and 2c of the drawing, which are combined to provide a simplified schematic drawing, the same reference numerals as in FIG. 1 are used insofar as possible to refer to the major components.

Commencing with the more conventional elements of the system on FIG. 2c, the control system operates on the turbine by means of a D.-C. motor 20 which controls valve position as follows. The D.-C. motor 20 rotates a lead screw 31, in one direction or the other depending upon the polarity of the control current. The lead screw actuates one end of "floating" lever 32 which serves as an input to the pilot valve 33 of the hydraulic relay 21. A source of hydraulic fluid under pressure positions piston 34 in accordance with movements of pilot valve 33 and also restores the pilot valve to the neutral position in the conventional manner. Movements of piston 34 control the position of a steam bypass valve 22 in the stop valve 22a, admitting steam to turbine 23.

In the system shown, steam is admitted through bypass valve 22 while all of the control valves, one of which is indicated as 35, are held open by apparatus not material to the present invention. Control valves 35 are normally actuated by a conventional speed governor 36 which opens and closes the control valves in sequence after the turbine is at rated speed and under substantial load. However, in lieu of the mechanical governor 36, an electrohydraulic governing system could be substituted. A suitable type is disclosed in U.S. Patent 3,097,488, issued to M. A. Eggenberger, P. H. Troutman, and P. C. Callan, on June 16, 1963, and assigned to the present assignee.

Referring to FIGS. 2a through 2c, the power supply for the control system is obtained from conventional 60 cycle, 115 volt A.-C. lines 37, which supply regulated constant voltage transformers 38a, 38b and transformer 39. The regulated A.-C. voltage from constant voltage transformer 38a is employed to obtain regulated D.-C. bias voltage sources shown generally as 40, 41. The negative D.-C. voltage bias source 40 includes a transformer 41, full wave bridge rectifier 42, a voltage divider comprising resistance 43 and potentiometer 44, and a Zener diode 45 connected in shunt with potentiometer 44 to hold the voltage across it as a constant value. A terminal 46, having a filter capacitor 47 connected to ground, provides an additional negative D.-C. source for accessory equipment. A selector knob 48 adjusts the tap on potentiometer 44 to select a negative D.-C. bias potential to act as the valve lift bias 18.

The regulated positive D.-C. bias source 41 comprises a transformer 49, rectifiers 50, and a first voltage divider including resistance 51 and parallel connected potentiometers 52, 53, with a voltage regulating Zener diode 54 connected in shunt across potentiometers 52, 53. A second voltage divider includes resistance 55 and potentiometer 56 with Zener diode 57 connected across potentiometer 56 to hold its voltage constant. A selector knob 58 adjusts the tap of potentiometer 56 to provide a selected D.-C. positive bias for speed reference 2. A selector knob 59 adjusts the tap on potentiometer 53 to select a positive D.-C. bias potential to serve as the speed error limit bias 7.

Additional bias signals are supplied by the frequency matching circuit shown generally as 60 and the speed varying device shown generally as 61. These furnish frequency matching bias potential 29 and speed varying bias potential 30 respectively.

Briefly, the frequency matching circuit employs logic elements as indicated by block 61 to compare the line frequency 62 with the frequency of generator 24 as indicated by 63 and provides a trim signal which adjusts the speed of turbine 23 so that it exactly matches the frequency of the line for purposes of synchronization before applying load.

The speed varying device 64 supplies by positive and negative potential sources 66, 67 provides a slowly and uniformly increasing and then decreasing D.-C. bias voltage, or flat triangular wave, which is cyclically repeated. Its function is to purposely cyclically increase and decrease the turbine speed over a long period of perhaps 6 minutes in order to prevent the turbine for remaining too long a time at a speed which might correspond to a critical frequency of the turbine blades during steady state speed governing.

Turning now to the feedback portions of the system, turbine speed is sensed by a 3 phase tachometer generator 69, which furnishes a voltage whose magnitude and frequency is proportional to speed. This voltage is rectified in 3 phase rectifier bridge 70, filtered in LC filter 71, and supplied to line 72 as a negative D.-C. voltage which is proportional to turbine speed. A meter 73, together with calibrating rheostat 74, provides a visual indication of actual speed.

Also, connected to line 72, is a capacitor 75, which serves as the acceleration circuit 28 referred to in FIG. 1. The other side of capacitor 75 is connected to line 76 in which will flow a current proportional to the time rate of change of the voltage on line 72 and which, therefore, is proportional to the acceleration of the turbine-generator rotor. A series connected meter 77, together with a protective bypass resistor 78, serves to give visual indication of actual acceleration.

The actual position of bypass valve 22 is indicated by a transducer comprising a differential transformer 79 and demodulator circuit 80 in a manner which should be selfexplanatory from the drawing and which is also referred to in the aforementioned U.S. Patent 3,098,176. The valve position transducer is supplied by constant voltage transformer 38b. One side of the demodulator circuit 80 is connected to an adjustable reference level shown by lead 81 connected to D.-C. positive bias potentiometer 52. Potentiometer 52 is used to calibrate the valve position transducer so that it will produce no signal when the valve is fully closed. The other side of demodulator 80 is connected to a lead 82 which furnishes a feedback signal proportional to valve opening.

The heart of the control system lies in the high gain D.-C. operational amplifiers designated as A1, A2, A3 and A4. These are preferably solid state transistorized units which are commercially available in modular units, such as Model No. 44D221506G01 manufactured by the General Electric Co. When employed with selected feedback impedances, they can perform amplification, integration, and various other analog functions, as is well known in the art. They also perform sign inversion on a D.-C. signal applied at the input.

Amplifier A1 is employed with a feedback resistance 83, and protective Zener diodes 84 to serve as the speed error amplifier 5. It serves to sum the positive and negative voltages applied to input resistors 85 through 89, invert the sign, and supply the resultant voltage to lead 90.

Amplifier A2 is connected as shown with an input impedance 91 and feedback impedance 92 and protective Zener diodes 93. A diode 94 connected at the output of amplifier A2 as shown, sharply limits the output of amplifier A2 to a selected bias voltage applied to resistor 95. This limiting positive D.-C. voltage is selected by adjusting selector knob 59, and the magnitude of the output voltage from the speed error limiting amplifier in a positive direction can then not exceed the value of the positive limiting bias set on potentiometer 53. However, the magnitude of the output signal from the amplifier in a negative direction is not limited. The electrical circuitry and the hydraulic components are connected in such a way that a positive voltage from limiting amplifier 6 requires the valve 22 to move to a more open position.

Amplifier A3 is connected to function as an integrator by virtue of a feedback capacitor 96. Additional elements include a series connected feedback impedance 97 input impedance 98, and a protective diode 99. Amplifier A3 with its associated circuitry serves as the acceleration error integrator 12 of FIG. 1.

A selectable portion of the output voltage from the acceleration error integrator 12 is taken from a voltage divider comprising grounded potentiometer 100 and supplied via the integrated error feedback lead 14 to input impedance 89 of the speed error amplifier 5.

According to the present invention, the function of the acceleration error integrator 12 is two-fold. When the control system is functioning in the acceleration control mode, amplifier A3 acts as an integrator so as to reduce the steady state acceleration error to zero regardless of the gain of the acceleration loop. This is desirable because the gain of the loop is dependent upon the boiler pressure. In other words, with varying steam pressures during start-up, the valve 22 would occupy different positions for the same acceleration of the turbine. The use of amplifier A3 as an integrator makes the acceleration independent of boiler pressure.

When the device transfers from the acceleration control mode to the speed control mode, it is desirable to remove the effect of the acceleration error integrator, in order to gain added speed stability (phase margin). One way to stop an operational amplifier from integrating is to place a resistor in parallel with the integrating capacitor in the feedback circuit. In this case an equivalent feedback path is used through potentiometer 100, resistor 89, amplifier A1 and A2, and resistor 98. This method was chosen since limiting by amplifier A2 during the acceleration mode makes the feedback path inoperative so that amplifier A3 acts as an integrator as described previously. On the other hand, nonlimiting by amplifier A2 will "close" the feedback path and amplifier A2 will have the characteristics of an almost lag-free follower with little loss of phase margin. Regardless of the mode in which the control system is operating, the output from the amplifier A3 serves as a valve positioning signal.

The valve positioning signal appears on lead 101 and is compared with the valve position feedback signal 15 appearing on lead 82 by means of the valve positioning amplifier 17. This consists of operational amplifier A4, input impedances 104, 105, 106, 107, 108, a feedback circuit 102, and protective diodes 103. The valve lift bias signal 18 is superimposed on the valve positioning signal by applying a selected voltage to input impedance 107 from the potentiometer 44 as determined by the setting on control knob 48.

The power amplifier 19 provides the energy that is needed to drive the D.-C. motor 22 in accordance with the output voltage of the valve positioning amplifier 17, and in the direction indicated by the polarity of the voltage from the valve positioning amplifier. The power amplifier 19 is preferably of the phase controlled type employing silicon controlled rectifiers. Motor voltage and current feedbacks, indicated by lines 109, 110, are supplied to input impedances 108, 105, respectively, of the valve positioning amplifier. Although not material to the present invention, the purpose of the motor voltage and current feedback signals is to obtain a negative feedback proportional to the speed of the D.-C. motor 20. This is done in order to avoid too fast a D.-C. motor speed during the time when the hydraulic pilot valve 33 has started to move, but the hydraulic piston 34 has not yet reacted.

*Operation (FIGS. 3 and 4)*

The operation of the invention can be more easily understood by reference to the simplified block diagrams of FIGS. 3 and 4. FIG. 3 illustrates the action of the control system in the acceleration control mode. When the speed error signal, i.e. the difference between the speed reference signal and the speed feedback signal, is very large after passing through the speed error amplifier 5, it is limited to a selectable value (knob 59) by the speed error limiting amplifier 6. A large speed error signal will automatically occur when the turbine is at standstill and the speed reference is increased to rated speed (knob 58). Since the speed error signal is limited to a constant value in the valve opening direction, this is equivalent to opening the closed loop of the speed control portion of the system at the input to the acceleration error integrator 12. Hence, the "limited speed error signal" serves as an acceleration reference signal (since it is a selectable constant value) and the functioning elements of the control system appear as shown in FIG. 3. Any "acceleration error," i.e. difference between the acceleration reference and the actual acceleration signals will be integrated and supplied to position the valve so as to hold acceleration constant at the value dictated by the limit bias through knob 59.

As the turbine approaches reference speed and the speed error signal has been reduced in magnitude below the limiting value set on the speed error limit bias, the control system automatically switches to the speed control mode which is represented in simplified form in FIG. 4. The valves are now positioned by a speed error signal, modified by a stabilizing acceleration feedback.

Thus, the control system shown offers direct control over the acceleration by means of matching a constant acceleration control mode. The acceleration reference signal is supplied by limiting the speed error signal by knob 59.

The system also offers automatic conversion to a speed control system, where the effect of the integrator is removed by virtue of the fact that the speed error signal is nonlimited. This provides a speed control system watching the speed reference set with knob 58 and stabilized by a modifying acceleration feedback signal.

The valve lift bias can be applied after the unit has been "synchronized" by turning knob 48 to superimpose an additional valve opening movement to apply partial load. Likewise, the trim signals applied by the frequency matching system 60 and the speed "wodulator" 61 are introduced into the control system without difficulty.

Thus, a control system of unusual flexibility and accuracy is achieved. While there is shown what is considered to be the preferred embodiment of the invention, other modifications will occur to those skilled in the art. It is desired to cover in the appended claims all such modifications as fall within the true spirit and scope of the invention.

What I claim as new and desire to secure by Letters Patent of the United States is:

1. In a control system for a prime mover of the type having valve means for controlling the admission of motive fluid to the prime mover, the combination of:
   first means providing a first electrical speed error signal representative of the difference between desired speed and actual speed of the prime mover, including circuit means limiting said speed error signal to a maximum selectable value,
   second means comparing said first signal with an electrical acceleration-responsive signal to provide a second error signal representative of the difference between desired acceleration and actual acceleration when the first signal is limited and representative of the speed error when the first signal is not limited, and
   motor means connected to position said valve so as to directly control prime mover acceleration and speed in response to said second signal.

2. In a control system for a prime mover of the type having means for controlling the admission of motive fluid to the prime mover, the combination of:
   first means providing a first electrical speed error signal representative of the difference between desired speed and actual speed of the prime mover, including circuit means limiting said speed error signal to a maximum selectable value,
   second means comparing said first signal with an electrical acceleration-responsive signal to provide a second error signal representative of the difference between desired acceleration and actual acceleration when the first signal is limited and representative of the speed error when the first signal is not limited,
   third means including an integrator and feedback network connected to modify said second signal by integrating the second signal with respect to time only when the first signal is limited, and
   motor means connected to position said valve so as to directly control prime mover acceleration and speed in response to said modified second signal.

3. In a control system for a prime mover of the type having valve means for controlling the admission of motive fluid to the prime mover, the combination of:
   first operational amplifier means providing a first D.-C. electrical speed error signal representative of the difference between desired speed and actual speed of the prime mover, including first circuit means limiting said first signal to a maximum selectable value,
   second operational amplifier means summing a D.-C. electrical acceleration-responsive signal with said first signal to provide a second error signal representative of the difference between desired acceleration and actual acceleration when the first signal is limited and representative of the speed error when the first signal is not limited, said second operational amplifier means including second circuit means comprising a feedback capacitor connected to the input of the second amplifier and third circuit means connecting a portion of the output of the second amplifier means to the input of the first amplifier means, and
   motor means connected to position said valve so as to directly control prime mover acceleration and speed in response to said second signal.

4. In a control system for a prime mover of the type having valve means for controlling the admission of motive fluid to the prime mover, the combination of:
   first means providing a first electrical speed error signal representative of the difference between desired speed and actual speed of the prime mover,
   second means limiting the magnitude of said first signal in a valve opening direction to provide a second selectably limited speed error signal,
   third means comparing said second signal with an electrical acceleration-responsive signal to provide a third signal representative of the difference between a desired acceleration and actual acceleration when the first signal is limited and also representative of the speed error when the first signal is not limited, said third means including circuit means connected to integrate said third signal with respect to time only when the first signal is limited, and
   motor means connected to position said valve so as to directly control prime mover acceleration and speed in response to said third signal.

5. In a control system for a prime mover of the type having valve means for controlling the admission of motive fluid to the prime mover, the combination of:
   a speed reference source providing a first selectable D.-C. electrical potential representing desired prime mover speed,
   a speed responsive source providing a second D.-C. electrical potential of opposite polarity to the reference source and proportional to actual prime mover speed,
   a first operational amplifier summing said first and second potentials to provide a third electrical potential representative of the difference between actual speed and desired speed,
   a limit bias source providing a fourth D.-C. electrical potential representative of a desired acceleration of the prime mover,
   a second operational amplifier connected to the output of the first amplifier and including limiting circuit means connected to said limit bias source to limit the magnitude to the third potential to that of the fourth potential,
   an acceleration-responsive source providing a fifth D.-C. electrical potential representative of actual acceleration of the prime mover,
   a third operational amplifier connected as an integrator and summing the third limited potential with the fifth acceleration-responsive potential to provide a valve positioning signal,
   feedback circuit means connecting the output of the third amplifier to the input of the first amplifier to provide an integrated error feedback path, whereby the third amplifier acts as an integrator when the output of the second amplifier is limited, while said feedback circuit impairs the integrating effect of the third amplifier when the output of the second amplifier is not limited, and
   motor means connected to position said valve so as to directly control prime mover acceleration and speed in response to said valve positioning signal.

6. In a control system for a prime mover of the type having a valve means for controlling the admission of motive fluid to the prime mover, the combination of:
   a speed reference source providing a first D.-C. electrical potential representative of a desired prime mover speed,
   a speed responsive source providing a second D.-C. electrical potential of opposite polarity to the reference source and representative of actual prime mover speed, a limit bias source providing a third D.-C. electrical potential representative of a desired prime mover acceleration, operational amplifier means connected to sum the first and second potentials and to limit the output to a maximum value determined by said third potential, an acceleration-responsive source providing a fourth D.-C. electrical potential representative of actual acceleration of the prime mover, means summing said fourth potential with the output of the first operational amplifier means to provide a valve positioning signal, and motor means connected to position said valve so as to directly control prime mover acceleration and speed in response to said valve positioning signal.

No references cited.

WILLIAM F. O'DEA, *Primary Examiner.*

C. R. GORDON, *Assistant Examiner.*